United States Patent
Abe (10) Patent No.: US 8,379,273 B2
(45) Date of Patent: Feb. 19, 2013

(54) IMAGE PROCESSING APPARATUS AND IMAGE PROCESSING METHOD

(75) Inventor: Noboru Abe, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 739 days.

(21) Appl. No.: 12/576,787

(22) Filed: Oct. 9, 2009

(65) Prior Publication Data

US 2010/0103467 A1 Apr. 29, 2010

(30) Foreign Application Priority Data

Oct. 28, 2008 (JP) ................. 2008-277379

(51) Int. Cl.
*H04N 1/405* (2006.01)
*H04N 1/46* (2006.01)
*G06K 9/36* (2006.01)
*G06K 9/46* (2006.01)

(52) U.S. Cl. ............ 358/3.13; 358/3.03; 358/3.06; 358/534; 358/536; 382/284; 382/294; 382/254

(58) Field of Classification Search .......... 358/3.13, 358/3.03, 3.06, 3.08, 534, 536; 382/284, 382/294, 254

See application file for complete search history.

(56) References Cited

U.S. PATENT DOCUMENTS 6,343,159 B1 * 1/2002 Cuciurean-Zapan et al. 382/284

FOREIGN PATENT DOCUMENTS

| JP | 03-157060 A | 7/1991 |
| JP | 04-362874 A | 12/1992 |
| JP | 06-121169 A | 4/1994 |
| JP | 2005-252701 A | 9/2005 |

OTHER PUBLICATIONS

Japanese Office Action issued on Jul. 6, 2012, in counterpart Japanese application No. 2008-277379.

* cited by examiner

*Primary Examiner* — Charlotte M Baker
(74) *Attorney, Agent, or Firm* — Fitzpatrick, Cella, Harper & Scinto (57) ABSTRACT

In a halftone image after halftone processing, significant dot values within a reference window that encompasses a pixel of interest are accumulated, and by referring to a conversion table based on the accumulated values, a multilevel pixel value that corresponds to that pixel of interest is restored. At this time, the size of the reference window is determined such that a product of a bit depth in the halftone processing and the number of pixels within the reference window becomes a minimum value that exceeds the number of tones in a multilevel image after restoration.

11 Claims, 11 Drawing Sheets

| 56 | 49 | 25 | 21 | 94 | 102 | 154 | 162 | 59 | 52 | 29 | 24 | 97 | 104 | 157 | 164 |
|---|---|---|---|---|---|---|---|---|---|---|---|---|---|---|---|
| 53 | 45 | 18 | 15 | 89 | 98 | 150 | 158 | 55 | 48 | 20 | 17 | 93 | 101 | 153 | 161 |
| 40 | 33 | 11 | 8 | 64 | 71 | 124 | 131 | 44 | 36 | 14 | 10 | 66 | 74 | 127 | 134 |
| 36 | 30 | 4 | 0 | 60 | 68 | 119 | 128 | 38 | 31 | 6 | 3 | 63 | 70 | 123 | 131 |
| 139 | 135 | 79 | 75 | 179 | 183 | 209 | 217 | 142 | 138 | 81 | 78 | 182 | 186 | 212 | 220 |
| 147 | 143 | 86 | 83 | 187 | 191 | 213 | 221 | 149 | 146 | 88 | 85 | 190 | 194 | 216 | 224 |
| 172 | 164 | 104 | 109 | 194 | 202 | 224 | 232 | 176 | 167 | 108 | 112 | 197 | 205 | 227 | 235 |
| 176 | 168 | 113 | 117 | 198 | 206 | 228 | 236 | 178 | 171 | 116 | 119 | 201 | 209 | 231 | 239 |
| 58 | 51 | 28 | 23 | 96 | 103 | 156 | 163 | 57 | 50 | 27 | 22 | 95 | 103 | 155 | 163 |
| 54 | 47 | 19 | 16 | 92 | 100 | 152 | 160 | 53 | 46 | 19 | 16 | 91 | 99 | 151 | 159 |
| 42 | 35 | 13 | 9 | 65 | 73 | 126 | 133 | 41 | 34 | 12 | 8 | 65 | 72 | 125 | 132 |
| 38 | 32 | 5 | 2 | 62 | 69 | 122 | 130 | 37 | 31 | 5 | 1 | 61 | 68 | 121 | 129 |
| 141 | 137 | 80 | 77 | 181 | 185 | 211 | 219 | 140 | 136 | 80 | 76 | 180 | 184 | 210 | 218 |
| 148 | 145 | 88 | 84 | 189 | 193 | 215 | 223 | 148 | 144 | 87 | 83 | 188 | 192 | 214 | 222 |
| 175 | 166 | 107 | 111 | 196 | 204 | 226 | 234 | 173 | 165 | 106 | 110 | 195 | 203 | 225 | 233 |
| 178 | 170 | 115 | 118 | 200 | 208 | 230 | 238 | 177 | 169 | 114 | 117 | 199 | 207 | 229 | 237 |

IMAGE PROCESSING APPARATUS AND IMAGE PROCESSING METHOD

BACKGROUND OF THE INVENTION

1. Field of the Invention

The present invention relates to an image processing apparatus, image processing method, and recording medium whereby a halftone image after halftone processing is restored to a multilevel image prior to halftone processing.

2. Description of the Related Art

An electrophotographic method is known as an image recording method used in an image processing apparatus such as a printer or a copy machine. In this electrophotographic method, a latent image is formed on a photosensitive drum using a laser beam, and developed by a charged color material (below, referred to as toner). Image recording is performed by transferring the developed image formed with toner to a transfer paper and fixing the image on the transfer paper.

Multi-tone image data that includes halftones is conceivable as the output image at that time, and in the above electrophotographic method, because a halftone image is difficult to obtain, it is ordinarily necessary to generate an image with a quasi-halftone method, and halftone processing as conversion processing in that method is necessary.

Figure 3A:
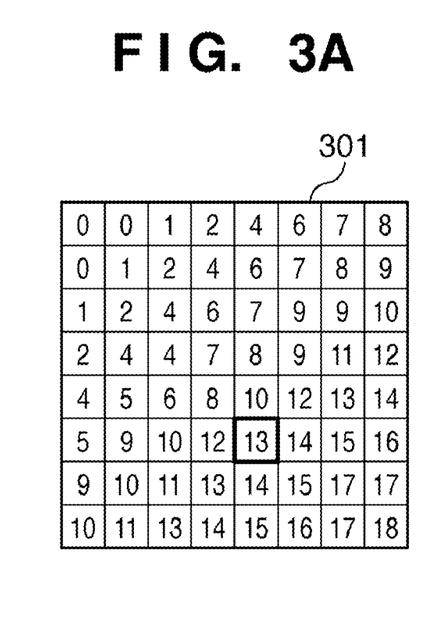
FIGS. 3A, 3B, and 3C illustrate 2-value conversion processing employing a dithering technique as ordinary halftone processing.
Figure 3B:
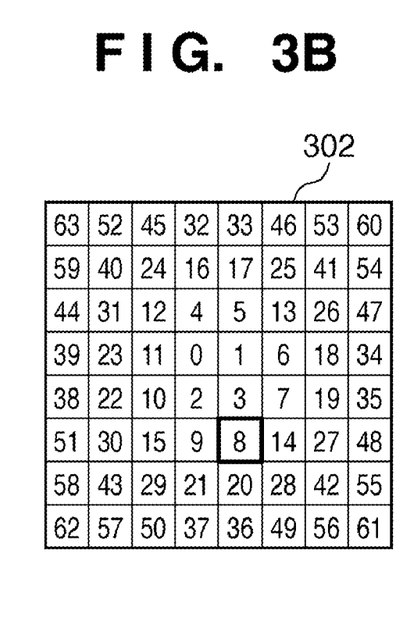
Figure 3C:
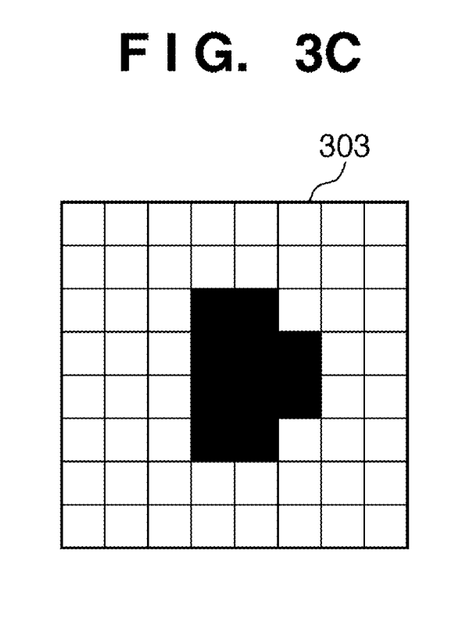

Here, a specific example of halftone processing is shown in FIGS. 3A to 3C. FIGS. 3A to 3C show principles of image 2-level conversion by a dithering technique for a two tone printer. First, an input multilevel image 301 (for example, an 8-bit tone image) is divided into N×M (in FIGS. 3A to 3C, 8×8) blocks. Then, the size of tone values of pixels within the blocks is compared with an N×M dither threshold matrix 302 of the same size. Black is output if the pixel value is larger than that threshold, and white is output in the case of other pixel values. By performing this processing for all pixels in each size of matrix, a 2-level-converted image 303 in which the entire image has been converted to two levels is obtained.

In FIGS. 3A to 3C, 2-level conversion by two tones (1-bit depth) is described, but by using a 2-bit or 4-bit dithering bit depth, it is possible to convert the entire image to four levels or 16 levels. When a 2-bit bit depth is used, three instances of the dither threshold are present, and a darker dot is output when the pixel value exceeds each threshold. When a 4-bit bit depth is used, 15 instances of the dither threshold are present. In either case, when a pixel value has exceeded all of the thresholds (three instances in the case of two bits, and 15 instances in the case of four bits), a point with the same maximum darkness as black is output with the two tone printer.

Ordinarily, when storing an image after halftone processing in a storage device, in the case of a color image, often the image is recorded in four colors: cyan, magenta, yellow, and black (referred to below as CMYK). In the case of a monochrome image, often the image is recorded in one color: black (referred to below as K). When using a halftone image that has been recorded in this manner in another printer or a personal computer (PC), problems as described below may occur.

For example, when a halftone image is sent to a PC via a network, because there are few applications that can handle a CMYK image on PCs, it is difficult to use a halftone image as-is on that PC.

When a halftone image is sent to another image output apparatus via a network, because the output characteristics are different for each apparatus, there may be instances where output cannot be performed so as to be certain of having optimal image quality with that image output apparatus, so image quality markedly deteriorates. For example, dither processing ordinarily used as halftone processing has a periodic nature, so when an image on which dither processing has been performed with a particular apparatus is output with another apparatus that has a different number of lines and angle of dither, often interference will occur between dithers and be visible as moiré, and thus the degree of deterioration becomes even more marked.

In order to avoid these problems, it is necessary to restore the halftone image to a multilevel image prior to halftone processing, to the extent possible. Therefore, a technique of restoring a multilevel image based on a dither threshold matrix has been proposed (for example, see Japanese Patent Laid-Open No. 2005-252701). According to this technique, by comparing the pixel values of a dither threshold matrix and a halftone image, a multilevel image prior to halftone processing is restored. With respect to a pixel that could not be restored by comparison with the dither threshold matrix, the value of that pixel is determined based on the value of an adjacent pixel that could be restored, and specifically, is set to the same value as the adjacent pixel.

However, according to the above conventional method for restoring image data prior to halftone processing, there are the following problems.

Specifically, when there are many pixels that could not be restored within the dither threshold matrix, because there are many estimated values as pixel values after restoration, often there are many errors in the image as a whole. Also, because a pixel that could not be restored is restored to the same value as an adjacent pixel, there may be a marked reduction in the sharpness of the restored image as a whole.

Also, because it is necessary to use a line buffer corresponding to the height (size of sub-scanning direction) of the dither threshold matrix, a large memory capacity is made necessary, depending on the size of the dither threshold matrix and the size of the image as a whole.

SUMMARY OF THE INVENTION

The present invention was made in order to address the above problems, and aims to provide an image processing apparatus and image processing method that restore a halftone image after halftone processing to a multilevel image prior to halftone processing with high accuracy, while holding used memory to a minimum.

As one embodiment for attaining the above object, the image processing apparatus of the present invention is provided with the below configuration.

According to one embodiment, the invention provides an image processing apparatus that restores a multilevel image before halftone processing, from a halftone image obtained by the halftone processing employing a threshold matrix, the image processing apparatus comprising:

a restoration unit that, accumulates significant dot values within a reference window that encompasses a pixel of interest in the halftone image, and that restores a multilevel pixel value that corresponds to that pixel of interest by referring to a conversion table based on the accumulated values;

wherein the size of the reference window is determined such that a product of a bit depth in the halftone image and the number of pixels within the reference window becomes a minimum value that exceeds the number of tones in the multilevel image.

According to the present invention having the above configuration, it is possible to restore a halftone image after halftone processing to a multilevel image prior to halftone processing with high accuracy, while holding used memory to a minimum.

Further features of the present invention will become apparent from the following description of exemplary embodiments (with reference to the attached drawings).

DESCRIPTION OF THE EMBODIMENTS

Embodiments of the present invention will now be described in detail with reference to the attached drawings. It should be noted that the constituent elements set forth in these embodiments are only examples, and do not limit the scope of the present invention.

First Embodiment

Apparatus Configuration

Figure 1:
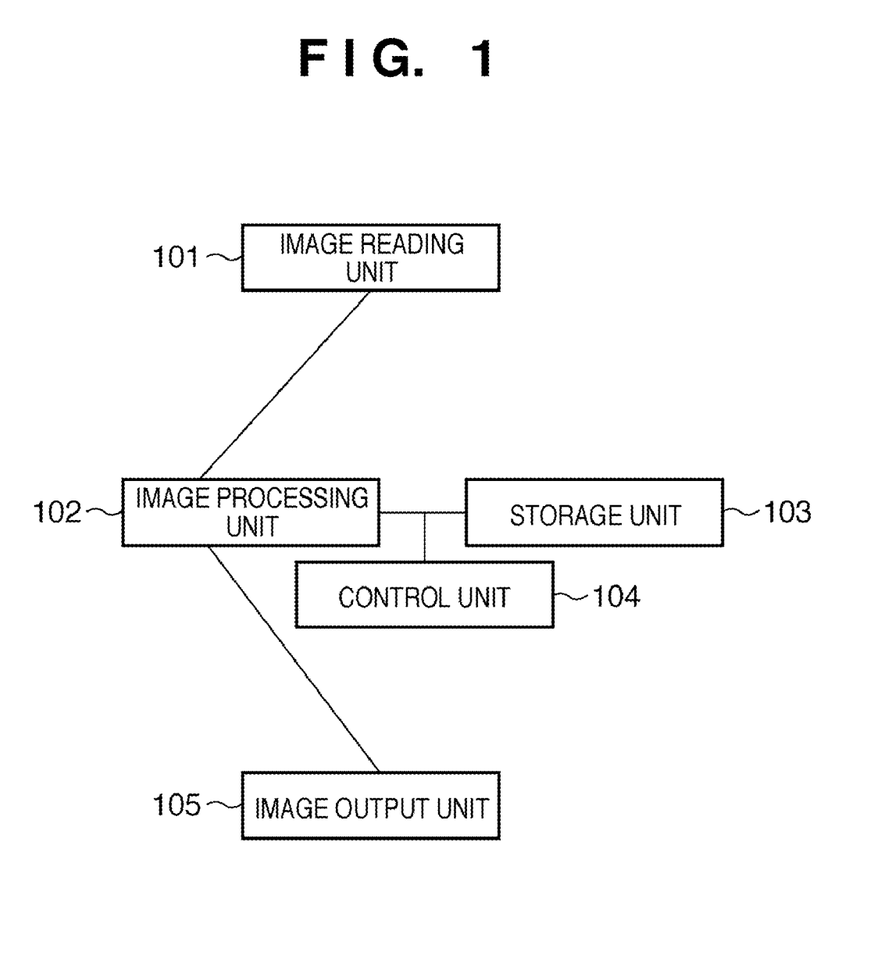
FIG. 1 is a block diagram that shows the schematic configuration of an image processing apparatus in one embodiment according to the present invention.

FIG. 1 is a block diagram that shows the configuration of an image processing apparatus in the present embodiment. The image processing apparatus of the present embodiment is provided with an image reading unit 101, an image processing unit 102, a storage unit 103, a control unit 104, and an image output unit 105. The image processing apparatus of the present embodiment can be connected via a network or the like to a server that manages image data, a PC that instructs execution of printing, or the like.

The image reading unit 101 reads an image of an original, and outputs image data.

The image processing unit 102 converts print information that includes image data input from the image reading unit 101 or from the outside into interim information, (below, referred to as an object), and stores the interim information in an object buffer of the storage unit 103. At that time, image processing such as darkness correction is performed. Furthermore, bitmap data is generated based on the object stored in the buffer, and the bitmap data is stored in the buffer of the storage unit 103. At that time, darkness adjustment processing, printer gamma correction processing, halftone processing by dithering, or the like is performed.

The storage unit 103 is comprised of a hard disk (HD) or the like, and is used as the above object buffer or the like. By storing image data in the object buffer, it is possible to sort pages, and by storing an original spanning a plurality of pages that have been sorted, it is possible to perform printing a plurality of copies to output.

The control unit 104 is comprised of a ROM, a RAM, a CPU, and so forth. The ROM stores various control programs and image processing programs executed by the CPU. The RAM is used as a reference area or work area where the CPU stores data or various information. Not only the storage unit 103, but also a RAM within the control unit 104 can be used as the above object buffer.

The image output unit 105 forms a color image on a recording medium such as recording paper, based on the image data that has been stored in the buffer of the storage unit 103.

Apparatus Overview

Figure 2:
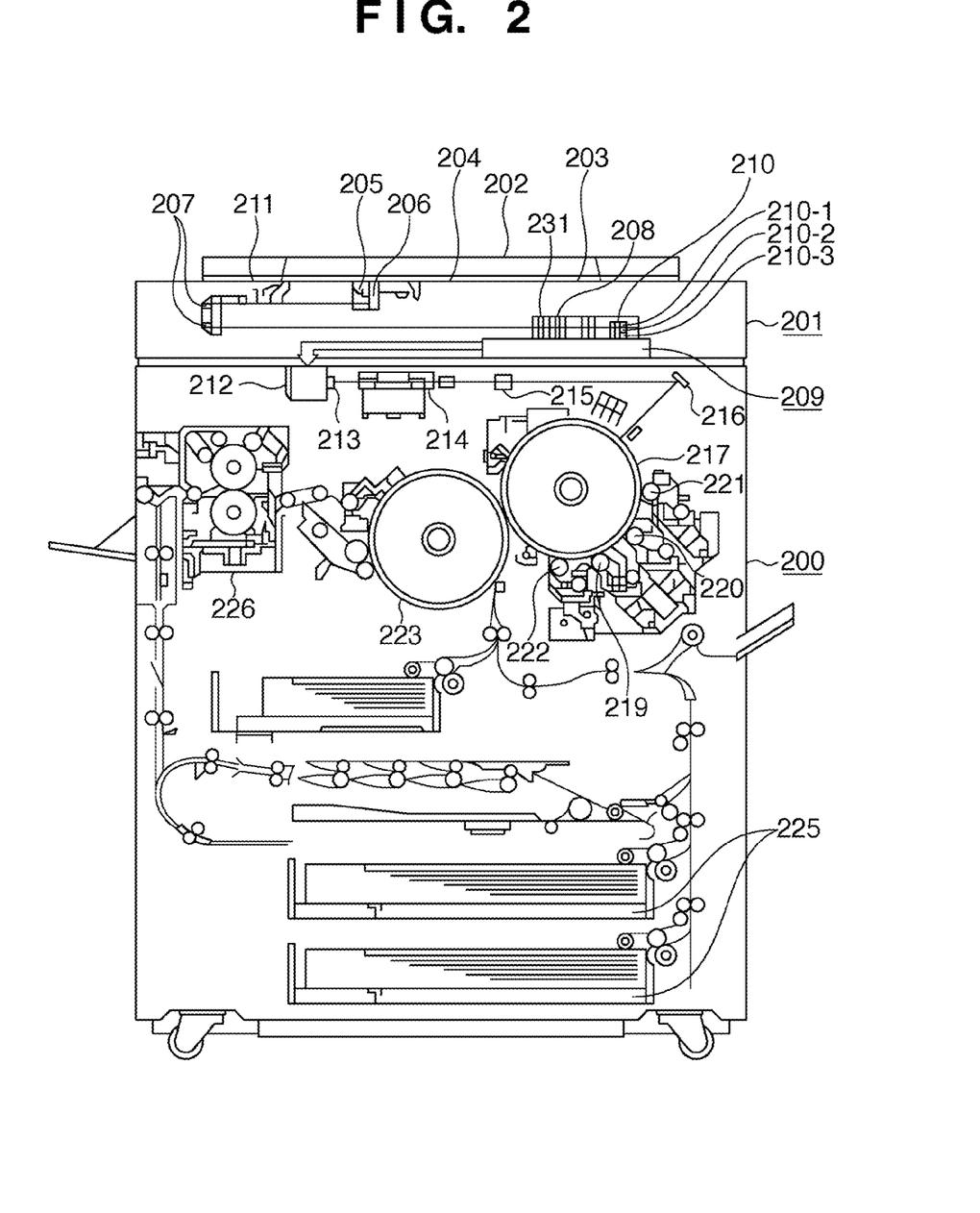
FIG. 2 shows an overview of the image processing apparatus in this embodiment.

FIG. 2 shows a side cross-section of the image processing apparatus in the present embodiment, broadly divided into a scanner unit 201 and a printer unit 200.

First, the scanner unit 201 corresponds to the image reading unit 101 shown in FIG. 1. In the scanner unit 201, an original 204 whose image is read is placed between a platen glass 203 and an original pressure plate 202, and the original 204 is irradiated with light of a lamp 205. Reflected light from the original 204 is guided to mirrors 206 and 207, and an image is formed on a 3-line sensor 210 by a lens 208. An infrared cutting filter 231 is provided to the lens 208. With an unshown motor, a mirror unit that includes the mirror 206 and the lamp 205 is moved in the direction of the arrow in FIG. 2 at a velocity V, and a mirror unit that includes the mirror 207 is moved in the direction of the arrow in FIG. 2 at a velocity V/2. That is, the mirror units move in the direction (sub-scanning direction) perpendicular to an electrical scanning direction (main scanning direction) of the 3-line sensor 210 to scan the entire face of the original 204.

The 3-line sensor 210 is comprised of a 3-line CCD, and performs color separation of input light information to read each color component, red R, green G, and blue B, of full color information and sends the color component signals to a controller unit 209. The CCDs which constitute the 3-line sensor 210 each have a light-sensitive element that corresponds to 5000 pixels, and are capable of reading an A3 size original at a resolution of 600 dpi in the short direction (297 mm), which is the largest size of an original that can be placed on the platen glass 203.

A standard white plate 211 corrects data that has been read with each CCD (210-1 to 210-3) of the 3-line sensor 210. The color of the standard white plate 211 is a white that exhibits approximately uniform reflective characteristics with visible light.

The controller unit 209 corresponds to the image processing unit 102, the storage unit 103, and the control unit 104 shown in FIG. 1. The controller unit 209 electrically processes an image signal input from the 3-line sensor 210 of the scanner unit 201 to generate a color component signal for each of magenta M, cyan C, yellow Y, and black K, and sends the generated signals to the printer unit 200.

The printer unit 200 corresponds to the image output unit 105 shown in FIG. 1. In the printer unit 200, the image signals for M, C, Y, and K that are sent from the scanner unit 201 are sent to a laser driver 212. The laser driver 212 modulates/drives a semiconductor laser element 213 according to the input image signals. A laser beam that is output from the semiconductor laser element 213 is scanned on a photosensitive drum 217 via a polygon mirror 214, an f-θ lens 215, and a mirror 216, thus forming an electrostatic latent image on the photosensitive drum 217.

The electrostatic latent image formed on the photosensitive drum 217 is developed with toner of corresponding colors by a magenta developer 219, a cyan developer 220, a yellow developer 221, and a black developer 222 alternately contacting the photosensitive drum 217, thus forming toner images. Recording paper supplied from a recording paper cassette 225 is wrapped around a transfer drum 223, and the toner images on the photosensitive drum 217 are transferred to that recording paper.

After toner images of the four colors M, C, Y, and K have been sequentially transferred to the recording paper as described above, the toner images are fixed by passing through a fixing unit 226, and then the recording paper is discharged out of the apparatus.

Halftone Processing

Figure 4:
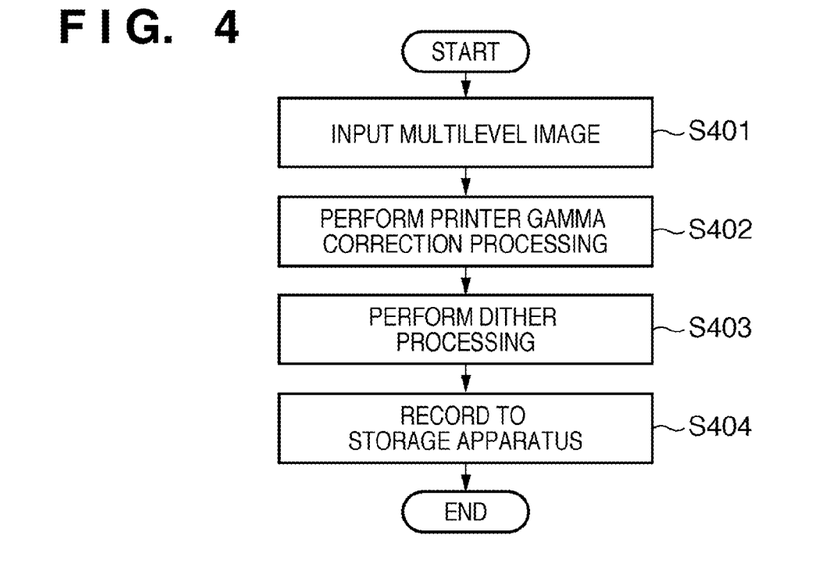
FIG. 4 is a flowchart that shows halftone image production processing by dithering in this embodiment.

Halftone processing that generates a halftone image in the image processing unit 102 is described with reference to a flowchart in FIG. 4.

First, in Step S401, the image processing unit 102 reads out an object stored in the object buffer of the storage unit 103, and inputs a multilevel image. Then, in Step S402, darkness correction processing such as printer gamma correction is performed on the input multilevel image in order to adapt to the output process within the image output unit 105. Then, in Step S403, by performing dither processing for a gamma-corrected image, a halftone image is generated. Then, in Step S404, that halftone image is stored in an image buffer of the storage unit 103.

Below is a description of an example of performing processing to restore a halftone image, on which dither processing has been performed as halftone processing, to a multilevel image in the present embodiment.

Multilevel Image Restoration Processing (Overall)

A feature of the image processing unit 102 of the present embodiment is restoring a halftone image, on which dither processing has been performed as halftone processing, to a multilevel image prior to halftone processing, as described above. Below, multilevel image restoration processing in the present embodiment will be described with reference to the flowchart in FIG. 5.

Figure 5:
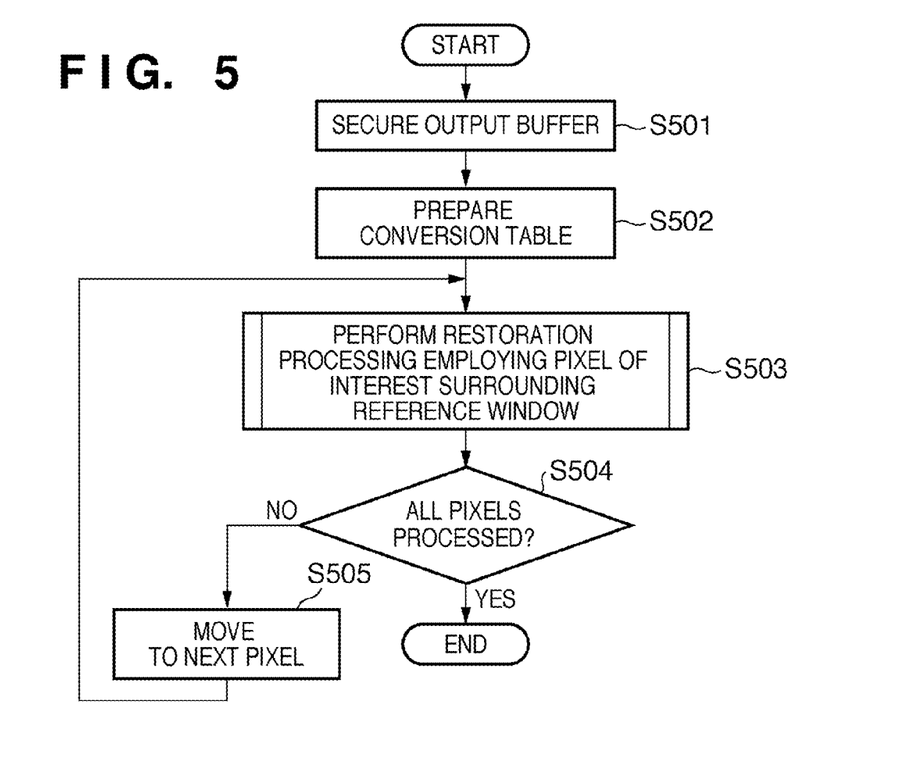
FIG. 5 is a flowchart that shows multilevel image restoration processing in this embodiment.

First, in Step S501, the image processing unit 102 secures an adequate buffer for outputting a halftone image stored in the storage unit 103 in the internal memory of the image processing unit 102.

Next, in Step S502, a conversion table that has been recorded in advance in the storage unit 103 is read out. This conversion table is a one-dimensional LUT for converting an accumulated value of dot values within a reference window in the halftone image to a pixel value of the multilevel image, and the conversion table has a size corresponding to the number of output tones. For example, where the number of output tones of the restored image is 256, the conversion table has 256 levels. The method for creating this conversion table will be described later.

Next, in Step S503, restoration processing for converting into a multilevel image is performed for each pixel of the halftone image. The details of this restoration processing will be described later.

Then, in Step S504, a determination is regarding whether or not the multilevel image restoration processing is finished for all pixels of the halftone image. If not yet finished, the routine proceeds to Step S505, and after setting the pixel to be processed to the next pixel, the restoration processing of Step S503 is repeated.

Details of Restoration Processing

Below is a detailed description of the multilevel image restoration processing in Step S503, with reference to FIG. 6.

Figure 6:
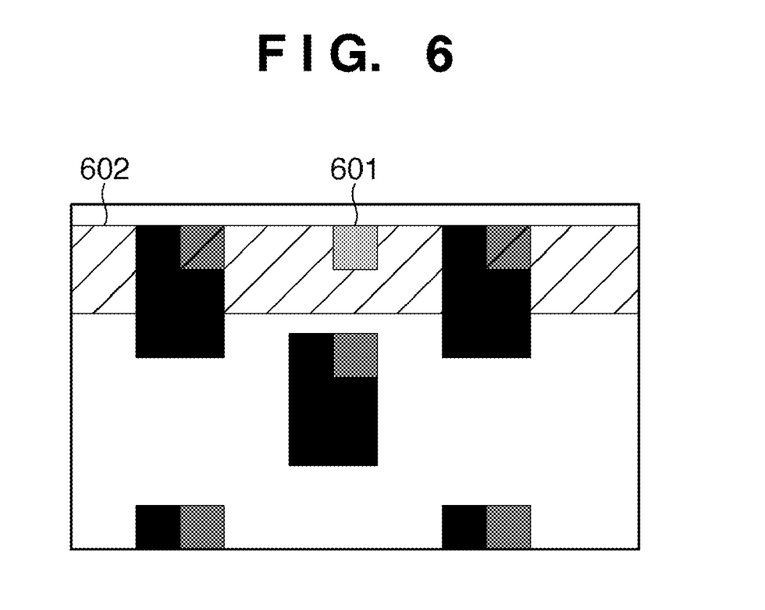
FIG. 6 shows a concept of estimating image darkness of a pixel of interest from a dot accumulation value within a reference window in this embodiment.

FIG. 6 shows a halftone image to be converted, including a pixel of interest 601. A reference window 602 surrounding the pixel of interest 601 has a rectangular shape that is long and thin in the lateral direction (main scanning direction). The image processing unit 102 obtains a dot accumulation value within the reference window 602 that surrounds the pixel of interest 601. A method for determining the size of the reference window 602 will be described later.

Here, the dot accumulation value is an accumulation of the values of dots that are lit within the reference window in the halftone image, that is, an accumulation of significant dot values that have a value other than 0. For example, in the case of dithering with a bit depth of 4 bits, the dot value has 16 levels: 0 to 15. By weighting this 16-level dot value, it is possible to perform multilevel conversion with a desired number of output tones. For example, when weighting is performed in the manner of 1/15→1, 2/15→2, . . . , 15/15→15, and the size of the reference window is 11×2, the dot accumulation value in that reference window can be obtained in a range of 0 to 330.

As described above, the conversion table used in Step S502 is the one-dimensional LUT in which the dot accumulation value within the reference window of the halftone image is converted to a multilevel image pixel value. In the present embodiment, by performing multilevel conversion of all pixels of the halftone image using this reference window and conversion table, the multilevel image is restored.

Here, the method for determining the size of the reference window in the present embodiment will be described. First, the reference window of the present embodiment has a width (size in the main scanning direction) with the same number of pixels as the width of a dither threshold matrix. The height (size in the sub-scanning direction) is determined as a number of pixels so as to satisfy formula (1) below. That is, a minimum "reference window height" necessary in order to satisfy the number of output tones is obtained.

$$(\text{number of output image tones}) \leq (\text{width of dither threshold matrix}) \times (\text{tones per 1 bit}) \times (\text{reference window height}) \quad (1)$$

More specifically, the size of the reference window in the present embodiment is determined such that the product of the bit depth in halftone processing and the number of pixels within the reference window becomes a minimum value that exceeds the number of tones in the multilevel image after restoration.

Here, in the present embodiment, the size of the dither threshold matrix is 11×11, and the bit depth is 4 bits. In this case, the product of the width of the dither threshold matrix and the tones per 1 bit is 11×15=165, so when added to a 0 tone it is possible to secure 166 tones. Accordingly, when the number of output tones is set to 256 tones, according to formula (1), the "reference window height" is 2 pixels, that is, 2 lines, and so if a reference window height of 2 lines is adopted, it is possible to secure a number of tones that is at least the number of output tones. In this way, in the present embodiment, in order to set the number of output tones to 256, the size of the reference window is determined as width× height=11×2. Size information of a reference window that has been generated with such a procedure is stored within the image processing unit 102.

Conversion Table

Figure 7:
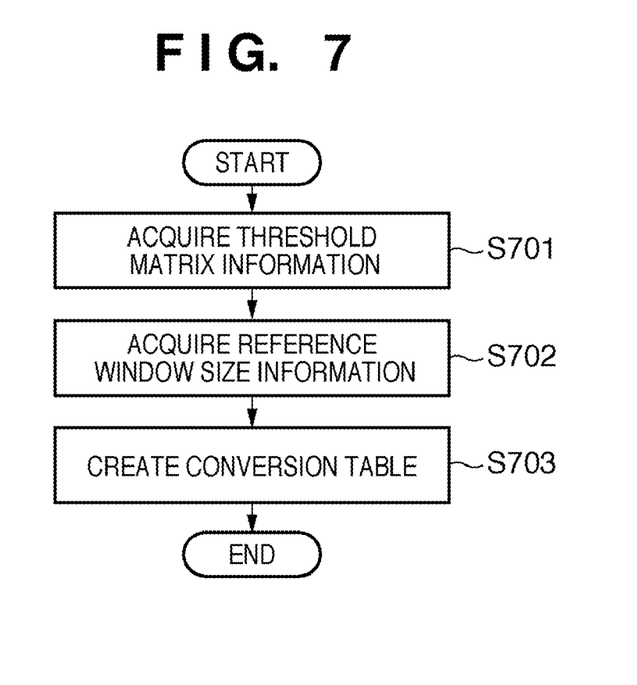
FIG. 7 is a flowchart that shows conversion table creation processing in this embodiment.

Below is a detailed description of the method for creating a conversion table for restoring a multilevel image from a halftone image in the present embodiment, with reference to the flowchart in FIG. 7.

First, in Step S701, the image processing unit 102 acquires dither threshold matrix information, and then in Step S702 acquires reference window size information. Then, in Step S703, a portion corresponding to the size of the reference window (11×2 in the present embodiment) is extracted from the dither threshold matrix, and a conversion table is generated based on the extracted dither threshold matrix.

Figure 8:
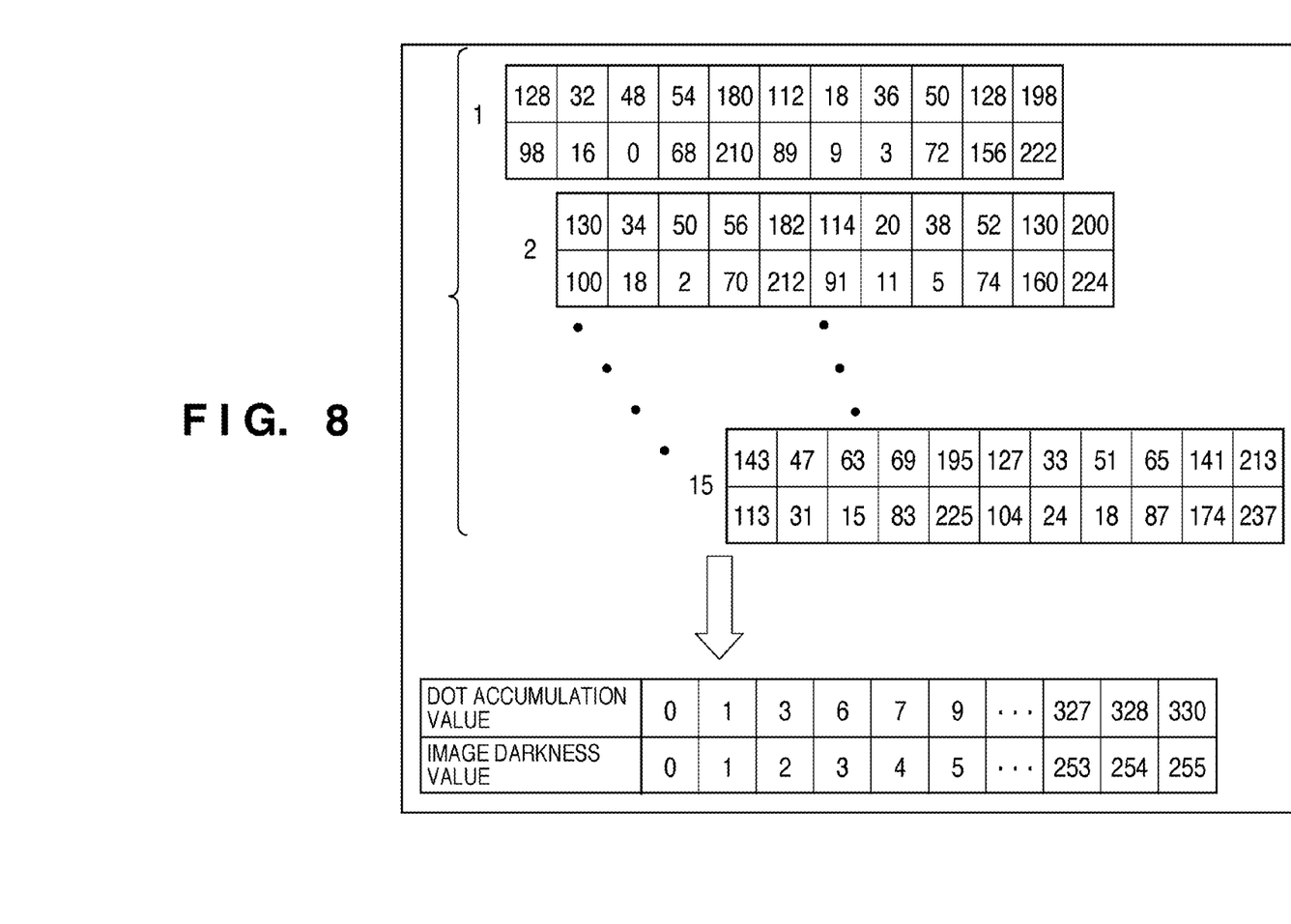
FIG. 8 shows an example of 4-bit dithering thresholds and an example of a generated conversion table in this embodiment.

Here, FIG. 8 shows a specific example of conversion table creation in the present embodiment. First, by extracting an 11×2 portion of threshold data from each of 15 dither threshold matrices for 4-bit dithering, a total of 15 partial matrices are obtained. Then, dither processing using all of the extracted partial matrices is performed for each pixel value 0 to 255, which are all the tones of the multilevel image to be output, and by accumulating each obtained significant dot value, it is possible to obtain a dot accumulation value that corresponds to each pixel value.

According to the present embodiment as described above, a multilevel image is restored from a halftone image using a minimum reference window generated based on a halftone processing threshold matrix size and bit depth, and a conversion table generated in the halftone processing based on the threshold matrix. Thus, a multilevel image in which the occurrence of moiré is suppressed is restored with high accuracy, while holding used memory to a minimum.

Second Embodiment

Below is a description of a second embodiment of the present invention. In the above first embodiment, an example was described in which a multilevel image is restored from a halftone image. However, there are cases where a beneficial effect is obtained by changing the manner of acquiring the reference window area depending on an angle between dot growing centers in the halftone processing. A feature of the second embodiment is determining the reference window by a different method than is used in the first embodiment.

Figure 9:
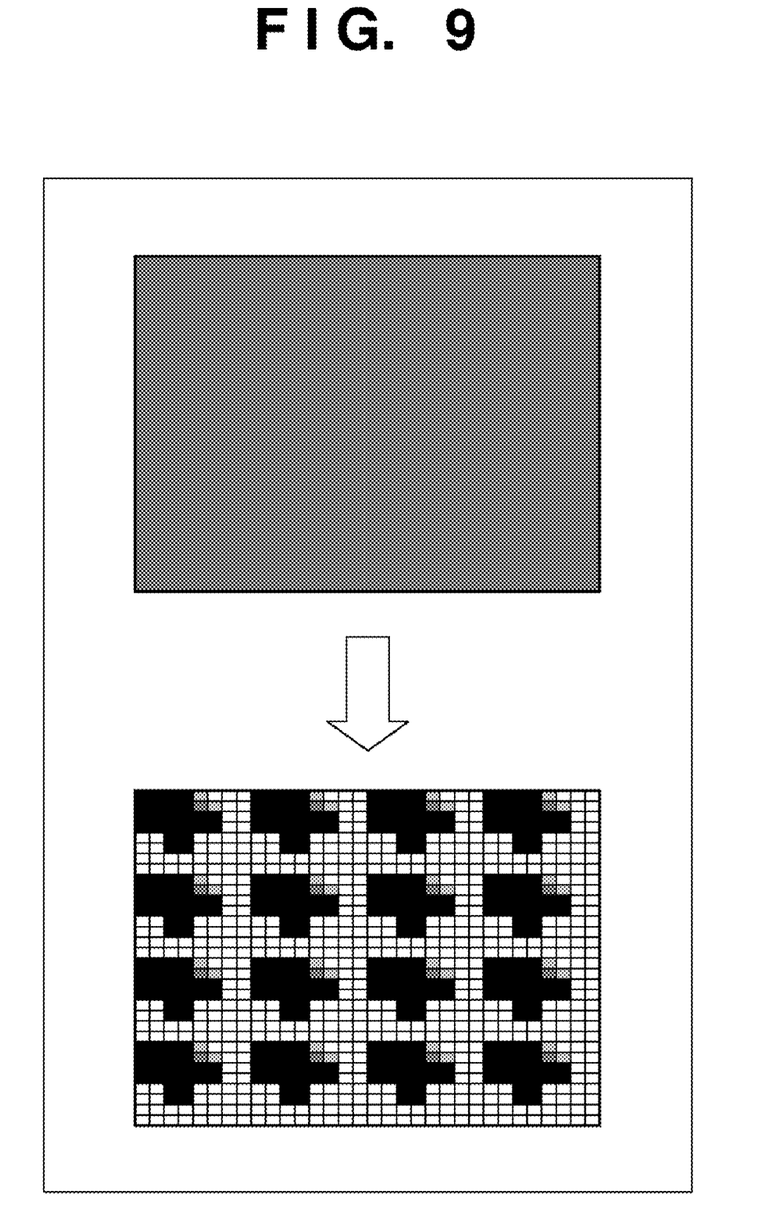
FIG. 9 shows an example of halftone processing when an angle between dot growing centers is 0 degrees.
Figure 10:
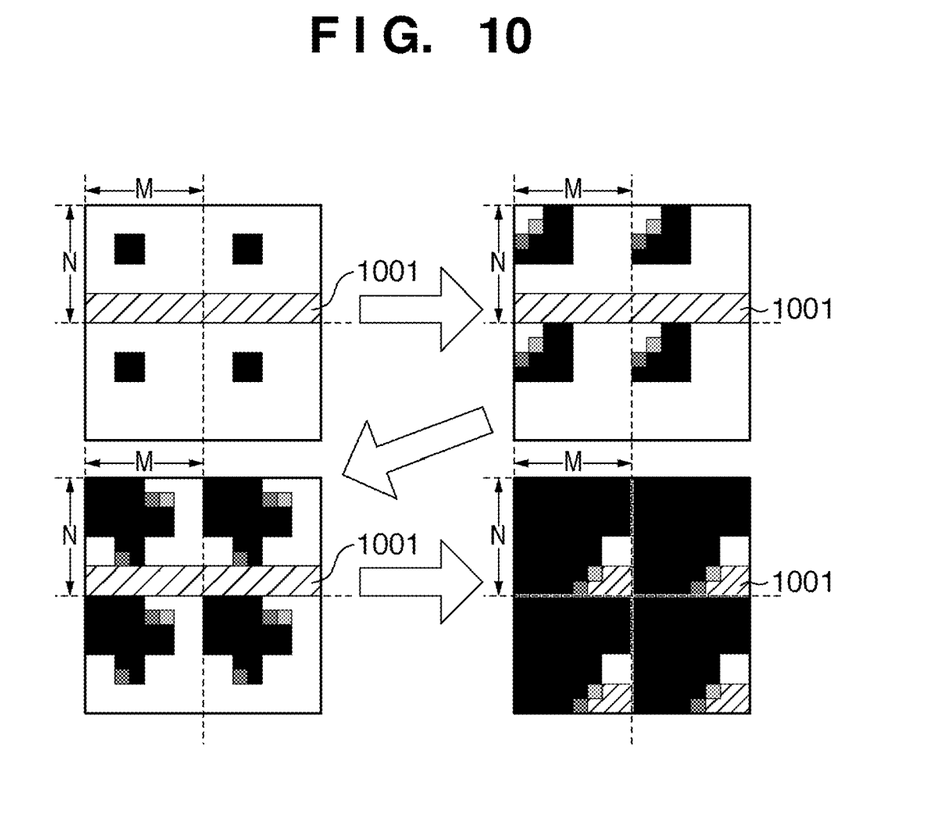
FIG. 10 shows an example of dither growing areas in an ordinary dithering technique.

FIG. 9 shows an example of halftone processing when the angle between dot growing centers in halftone processing is 0 degrees, for a multilevel image having uniform darkness. FIG. 10 shows dot growing circumstances in the halftone processing shown in FIG. 9, and it is understood here that significant dots are growing due to halftone processing such that an M×N rectangle centered on a dot growing center pixel is filled. A reference window 1001 in FIG. 10 is determined based on formula (1) disclosed in the first embodiment.

In a case where halftone processing has been performed such that the angle between dot growing centers is 0 degrees for an image of uniform darkness as in FIG. 9, when a multilevel image is restored from the obtained halftone image using the reference window 1001 from the first embodiment, a streaky pattern may occur. This is because, as shown in FIG. 10, in such a halftone image, there are many locations where a dot does not exist within the reference window 1001, which is longer in the lateral direction (the main scanning direction).

Figure 11:
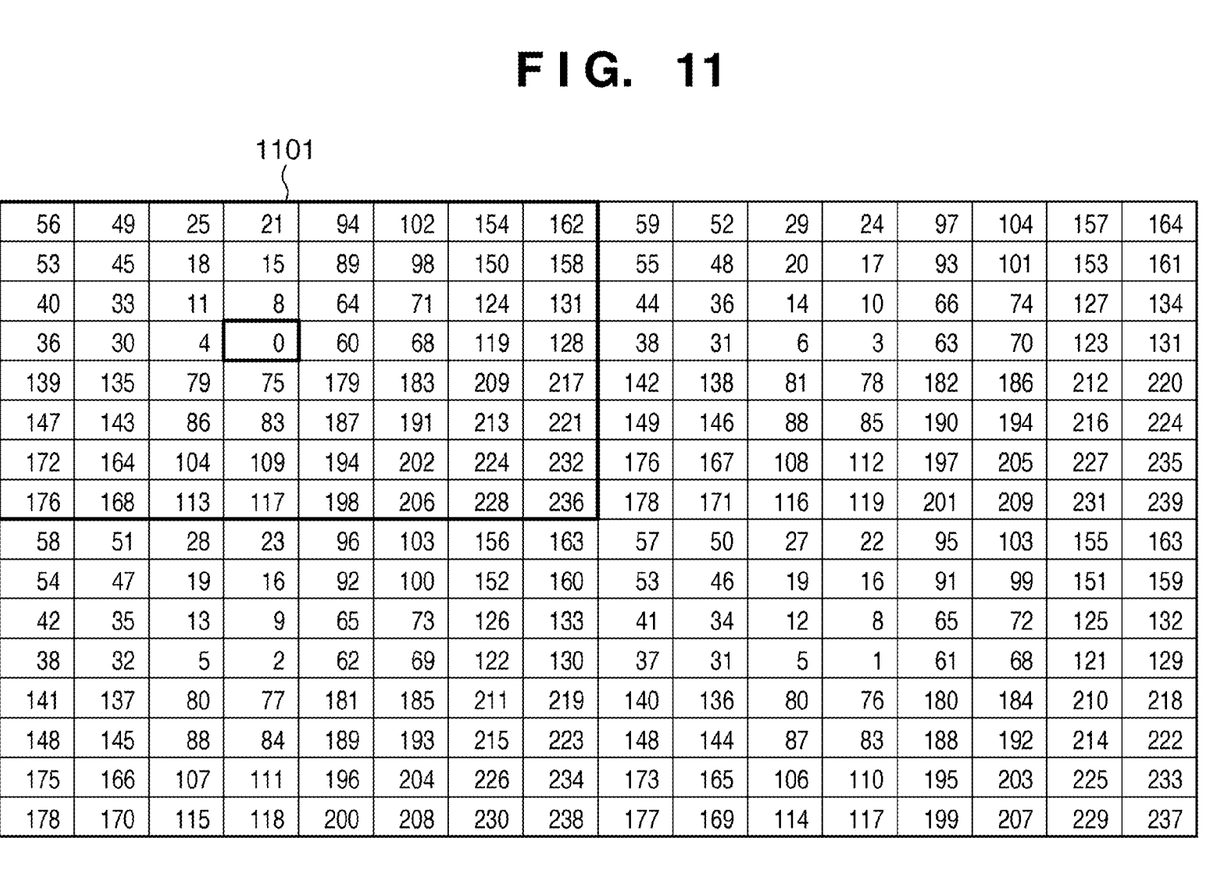
FIG. 11 shows an example setting of a reference window in a second embodiment.
Figure 12A:
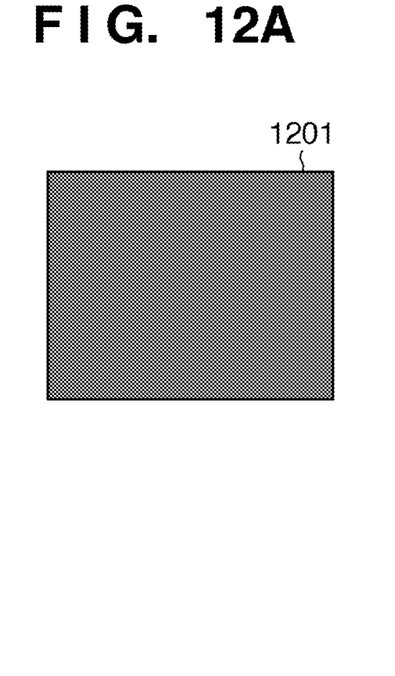
FIGS. 12A, 12B, 12C, and 12D show examples of comparison of a multilevel image that has been restored in the second embodiment and a multilevel image that has been restored in the first embodiment.
Figure 12B:
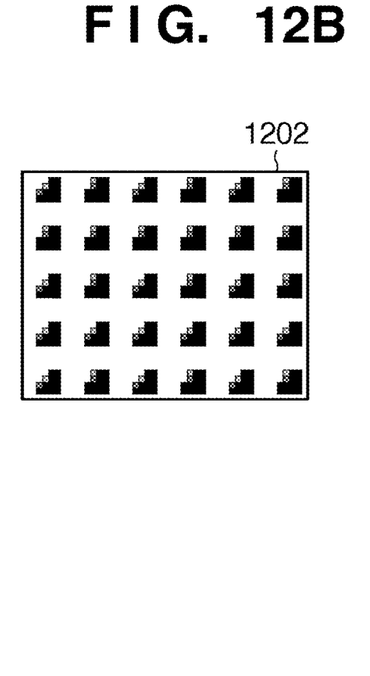
Figure 12C:
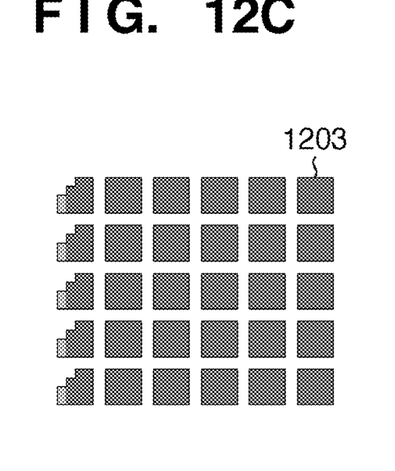
Figure 12D:
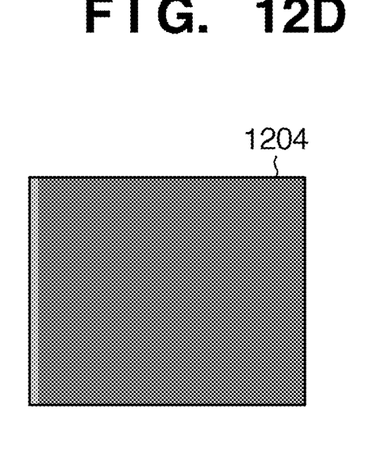

Therefore, in the second embodiment, as shown in FIG. 11, a reference window 1101 is determined at a size so as to encompass one M×N rectangle, which is the dot growing area in halftone processing, and so as not to interfere with an adjacent dot growing area. That is, a colored pixel '0' within the reference window 1101 in FIG. 11 corresponds to the dot growing center. By using such a reference window 1101, even when restoring a multilevel image from a halftone image generated by halftone processing performed on an image of uniform darkness, it is possible to perform restoration with high accuracy in which occurrence of a streaky pattern is suppressed, with a minimum memory configuration.

Here, FIGS. 12A to 12D show an example of a multilevel image obtained using the reference window determined in the first embodiment, and a multilevel image obtained using the reference window determined in the second embodiment, for a halftone image when the angle between dot growing centers in halftone processing is 0 degrees. That is, FIGS. 12A to 12D show an original multilevel image (original image) 1201, and a halftone image 1202 obtained by performing halftone processing on the original multilevel image. Also, a multilevel image 1203 is obtained by restoring the halftone image 1202 using the reference window of the first embodiment, and a multilevel image 1204 is obtained by performing restoration using the reference window of the second embodiment. According to FIGS. 12A to 12D, it is clear that white streaks occur in the multilevel image 1203 according to the first embodiment, but in the multilevel image 1204 according to the second embodiment, the original image 1201 is mostly restored.

According to the second embodiment as described above, when the angle between dot growing centers in halftone processing is 0 degrees, the size of the reference window is determined so as not to encompass a rectangle, which is the dot growing area, and so as to not interfere with an adjacent dot growing area. Thus, particularly when a halftone image of uniform darkness is to be processed, it is possible to perform restoration to an appropriate multilevel image.

Third Embodiment

Figure 14:
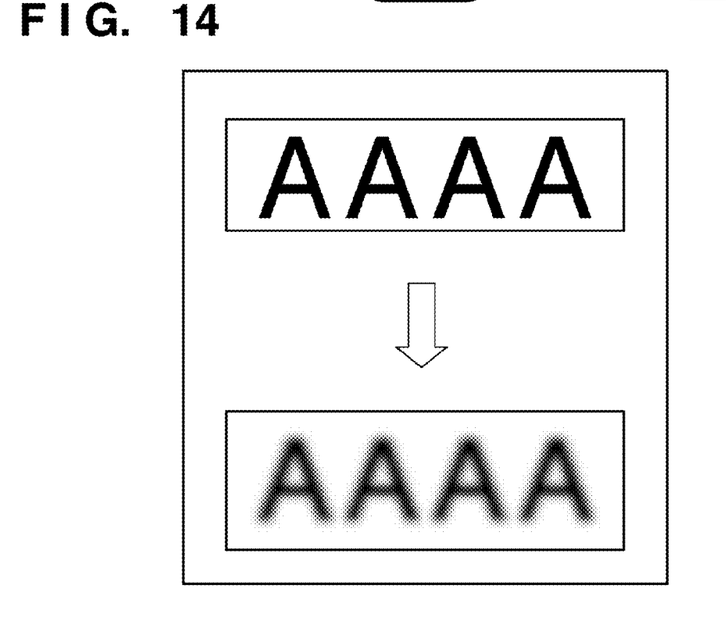
FIG. 14 shows an example in which edge sharpness is not maintained in a multilevel image that has been restored in the first embodiment.

Below is a description of a third embodiment of the present invention. In the above first embodiment, an example is described in which a multilevel image is restored from a halftone image. However, in an image in which there is a sharp difference in darkness, for example in an image in which there is black text on a white background as shown in FIG. 14, there may be instances when edge sharpness in the restored multilevel image is low, and image softness occurs as a result. In the third embodiment, an example of restoring a multilevel image in which sharpness is further maintained relative to the first embodiment is disclosed.

Figure 13:
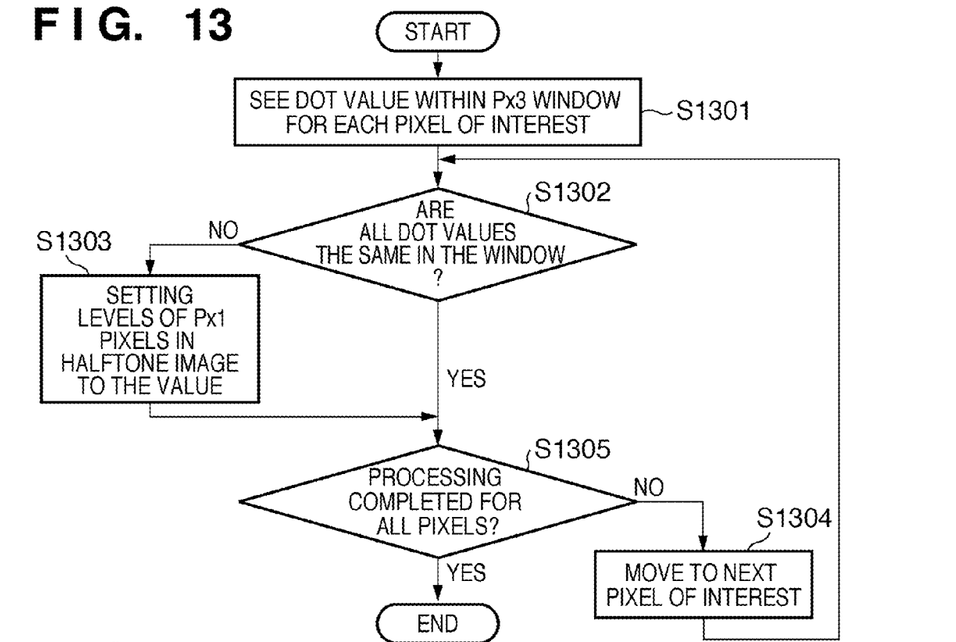
FIG. 13 is a flowchart that shows multilevel image restoration processing in the third embodiment.

FIG. 13 is a flowchart that shows multilevel image restoration processing in the third embodiment. The steps shown in FIG. 13 can be performed after the steps shown in FIG. 5 are finished.

First, in Step S1301, the image processing unit 102 looks up dot values of the halftone image using a reference window constituted from an area of P pixel width×3 lines and centered on a pixel of interest (where P is an arbitrary integer).

Next, in Step S1302, a determination is regarding whether or not all of the dot values of the halftone image within the reference window are the same; if all of the dot values are the same, then the routine proceeds to Step S1303, and if even one dot value is different, then the routine proceeds to Step S1305.

In Step S1303, as the multilevel image to be output, with respect to pixels at the same coordinates as an area of P pixel width×1 line, which is the center line of the reference window of P pixel width×3 lines, the dot values of the halftone image are used as-is for the levels of the multilevel image, and the routine proceeds to Step S1305. In this way, when all of the dot values of the halftone image within the reference window are the same, those halftone image values are kept unchanged as the levels of the multilevel image, and thus sharpness of the image as a whole is maintained.

Then, in Step S1305, a determination is made regarding whether or not processing has finished for all pixels in the halftone image, and if not finished, then in Step S1304, the pixel to be processed is moved to the next pixel of interest. The processing of above Steps S1302 to S1305 is repeated until processing for all pixels is completed.

In the third embodiment, an example was described in which the reference window has a height of 3 lines, but the same sharpness maintaining effect is obtained as long as the height of the reference window is an odd number of lines.

As described above, according to the third embodiment, edge sharpness is well-maintained in portions of sharp difference in darkness, such as black text on a white background.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-277379, filed Oct. 28, 2008, which is hereby incorporated by reference herein in its entirety.

What is claimed is:

1. An image processing apparatus that reconstructs a multilevel image from a halftone image obtained by subjecting previous multilevel image data to halftone processing employing a threshold matrix, the image processing apparatus comprising:
a restoration unit that accumulates significant dot values within a reference window that encompasses a pixel of interest in the halftone image, and that restores a multilevel pixel value that corresponds to the pixel of interest by referring to a conversion table based on the accumulated dot values,
wherein a height of the reference window is determined such that a product of a width of the threshold matrix, a number of tones in the halftone image and the height of the reference window becomes a minimum value that exceeds the number of tones in the multilevel image, and the width of the reference window is set to the width of the threshold matrix.

2. The image processing apparatus according to claim 1, wherein the conversion table is generated by extracting a partial matrix that corresponds to the size of the reference window from the threshold matrix, and performing the halftone processing using the partial matrix for all the tones of the multilevel image.

3. The image processing apparatus according to claim 2, wherein the conversion table is generated based on an accumulated value obtained by accumulating significant dot values obtained by the halftone processing using the partial matrix for all the tones of the multilevel image.

4. The image processing apparatus according to claim 1, further comprising a halftone processing unit that generates a halftone image by the halftone processing employing the threshold matrix.

5. The image processing apparatus according to claim 1, wherein when an angle between dot growing centers is θ degrees in the halftone processing of the halftone image, the size of the reference window is determined so as to encompass an area that includes a pixel at the dot growing center, and so as not to interfere with an adjacent dot growing area.

6. The image processing apparatus according to claim 1, wherein
the height of the reference window corresponds to a height of an odd number of lines in the halftone image, and
when all of the pixels inside of the reference window centered on the pixel of interest in the halftone image have the same dot value, said restoration unit performs restoration by setting levels of pixels in a 1-line portion of the multilevel image corresponding to a center line of the reference window, to the same dot value in the halftone image.

7. The image processing apparatus according to claim 6, wherein the height of the reference window corresponds to the height of a 3-line portion in the halftone image.

8. A non-transitory computer-readable storage medium storing an executable program for causing a computer to execute an image processing method for reconstructing a multilevel image from a halftone image obtained by subjecting previous multilevel image data to halftone processing employing a threshold matrix, the method comprising:
a restoration step of accumulating significant dot values within a reference window that encompasses a pixel of interest in the halftone image, and restoring a multilevel pixel value that corresponds to the pixel of interest by referring to a conversion table based on the accumulated dot values,
wherein a height of the reference window is determined such that a product of a width of the threshold matrix, a number of tones in the halftone image and the height of the reference window becomes a minimum value that exceeds the number of tones in the multilevel image, and the width of the reference window is set to the width of the threshold matrix.

9. An image processing method for reconstructing a multilevel image from a halftone image obtained by subjecting previous multilevel image data to halftone processing employing a threshold matrix, the method comprising:
a restoration step of accumulating significant dot values within a reference window that encompasses a pixel of interest in the halftone image, and restoring a multilevel pixel value that corresponds to the pixel of interest by referring to a conversion table based on the accumulated dot values,
wherein a height of the reference window is determined such that a product of a width of the threshold matrix, a number of tones in the halftone image and the height of the reference window becomes a minimum value that exceeds the number of tones in the multilevel image, and the width of the reference window is set to the width of the threshold matrix.

10. The image processing method according to claim 9, wherein the conversion table is generated by extracting a partial matrix that corresponds to the size of the reference window from the threshold matrix, and performing the halftone processing using the partial matrix for all the tones of the multilevel image.

11. The image processing method according to claim 10, wherein the conversion table is generated based on an accumulated value obtained by accumulating significant dot values obtained by the halftone processing using the partial matrix for all the tones of the multilevel image.

* * * * *